United States Patent
Taguchi

(10) Patent No.: US 7,557,813 B2
(45) Date of Patent: Jul. 7, 2009

(54) PICTURE DISPLAYING METHOD, PICTURE DISPLAYING PROGRAM, AND EDITING APPARATUS

(75) Inventor: Kazuaki Taguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 361 days.

(21) Appl. No.: 11/254,983

(22) Filed: Oct. 20, 2005

(65) Prior Publication Data

US 2006/0088229 A1    Apr. 27, 2006

(30) Foreign Application Priority Data

Oct. 22, 2004    (JP)    ............................ P2004-308050

(51) Int. Cl.
G09G 5/02    (2006.01)
(52) U.S. Cl. ........................ 345/589; 345/629; 345/617; 345/619; 715/723
(58) Field of Classification Search .................. 715/704
See application file for complete search history.

(56) References Cited

U.S. PATENT DOCUMENTS 6,154,600 A * 11/2000 Newman et al. ................ 386/4
6,292,184 B1 * 9/2001 Morgan ....................... 345/600
6,292,620 B1 * 9/2001 Ohmori et al. ................. 386/55
2001/0020953 A1 * 9/2001 Moriwake et al. ........... 345/723

FOREIGN PATENT DOCUMENTS

JP      11 66815       3/1999
JP      2000 36919     2/2000
JP      2002 247504    8/2002

OTHER PUBLICATIONS

Photoshop Lesson 23: Gradients (http://iit.bloomu.edu/vthc/Photoshop/DRAWING/gradients.htm).*

* cited by examiner

Primary Examiner—Kee M Tung
Assistant Examiner—Michelle K Lay
(74) Attorney, Agent, or Firm—Frommer Lawrence & Haug LLP; William S. Frommer; Thomas F. Presson

(57) ABSTRACT

A picture displaying apparatus and method of arranging mapping corresponding to the whole or a part of a material that has a time concept in time series on a screen. Gradation is set to the mapping of the whole of the material. Gradation that is set to a region corresponding to the arranged mapping of the gradation that has been set to the whole of the material is added to the arranged mapping.

10 Claims, 13 Drawing Sheets

Fig. 2

| | | | TextClip0001 00:00:01:23--> 00:00:02:23 | | | |
|---|---|---|---|---|---|---|
| TEXT | T | | | | | |
| ▶GRAPHICS S | | | iC-14_1024 00:00:01:23--> 00:00:02:23 | | | |
| ▼VIDEO | | | iC-Ken 00:00:01:23 | | iC-TOKUDA MOTOKO, ROMANTIC 00:00:0 | iC-Huk |
| AUDIO ◁100% | ◎ | | iC-Ken | ◎ | iC-TOKUDA MOTOKO, ROMANTIC | iC-Huk ◎ |
| EX-AUDIO ◁100% | ◎ | | iC-57-Audio Track 57 00:00:01:23--> 00:00:02:23 | ◎ | ◎ | iC-youthful 00:00:01:23- |
| TEMPLATE | | | TplClip0001 00:00 01:20 | | 00:00 03:10 | 00:00 |

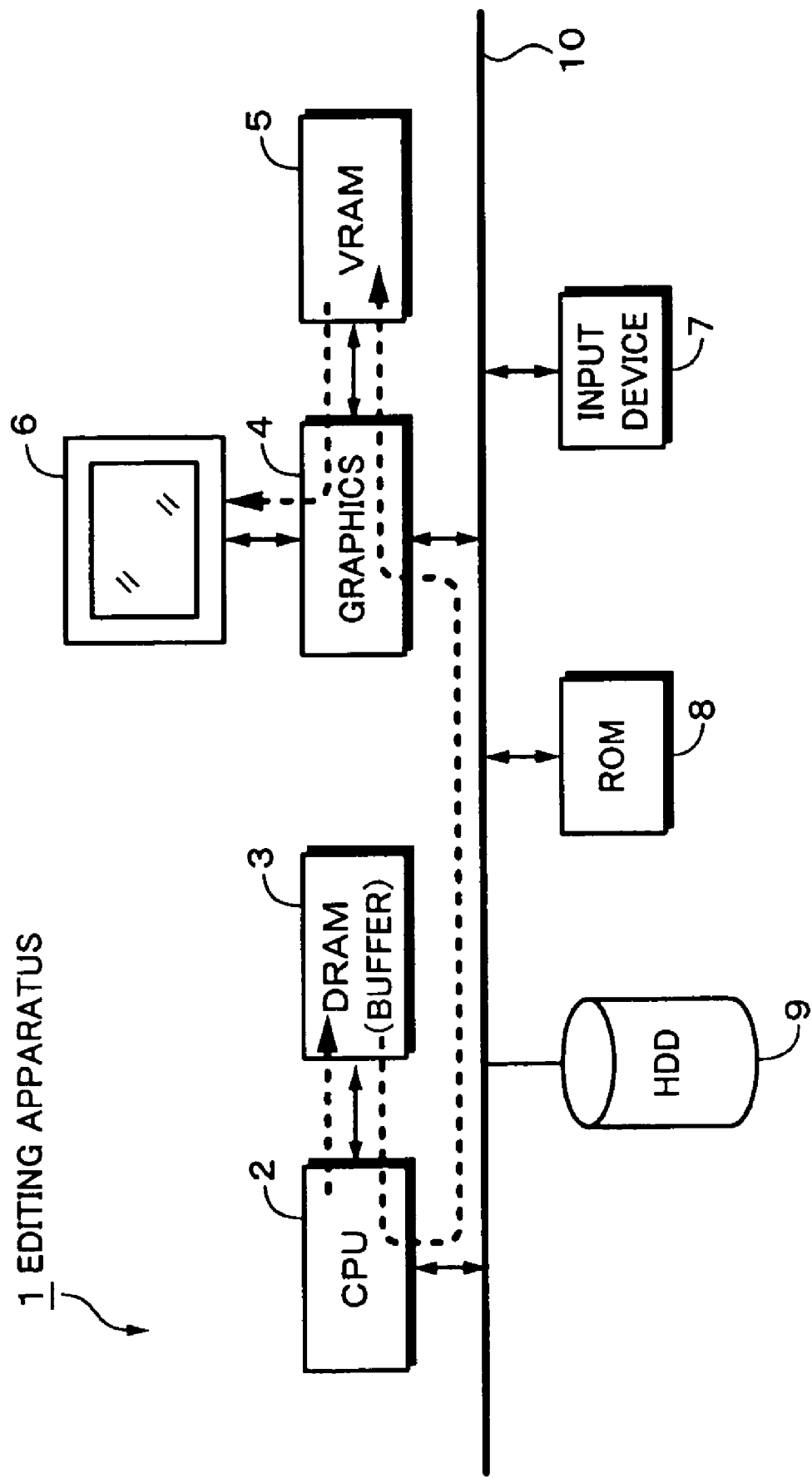

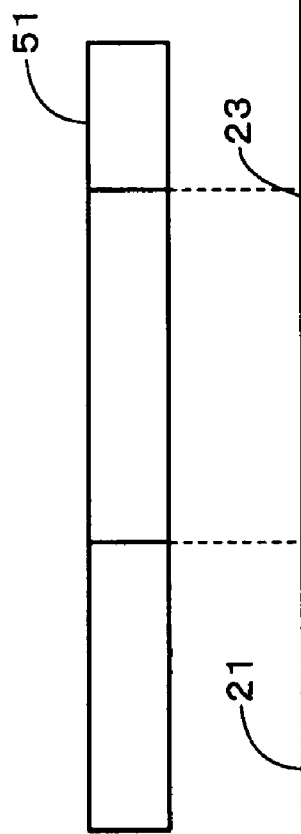
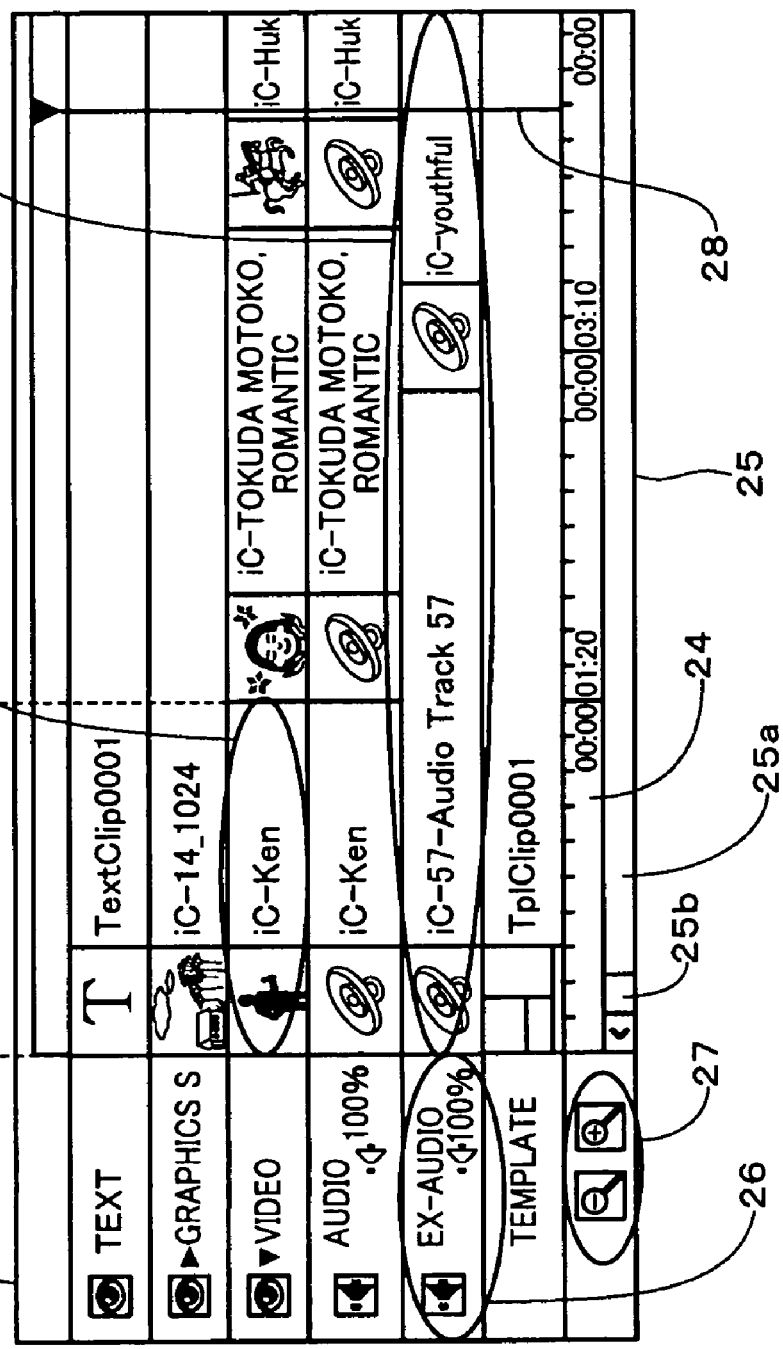
Fig. 4A
Fig. 4B

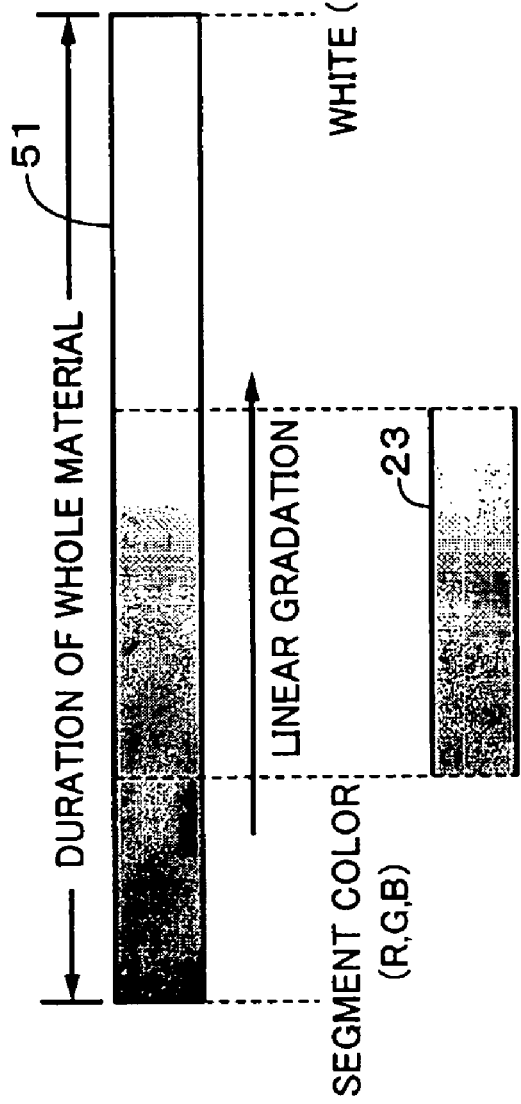
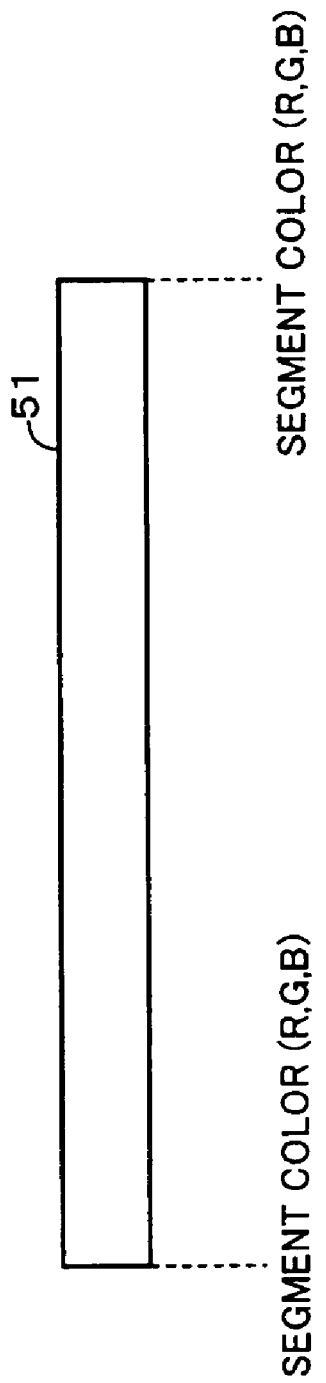
Fig. 7A
Fig. 7B
Fig. 7C

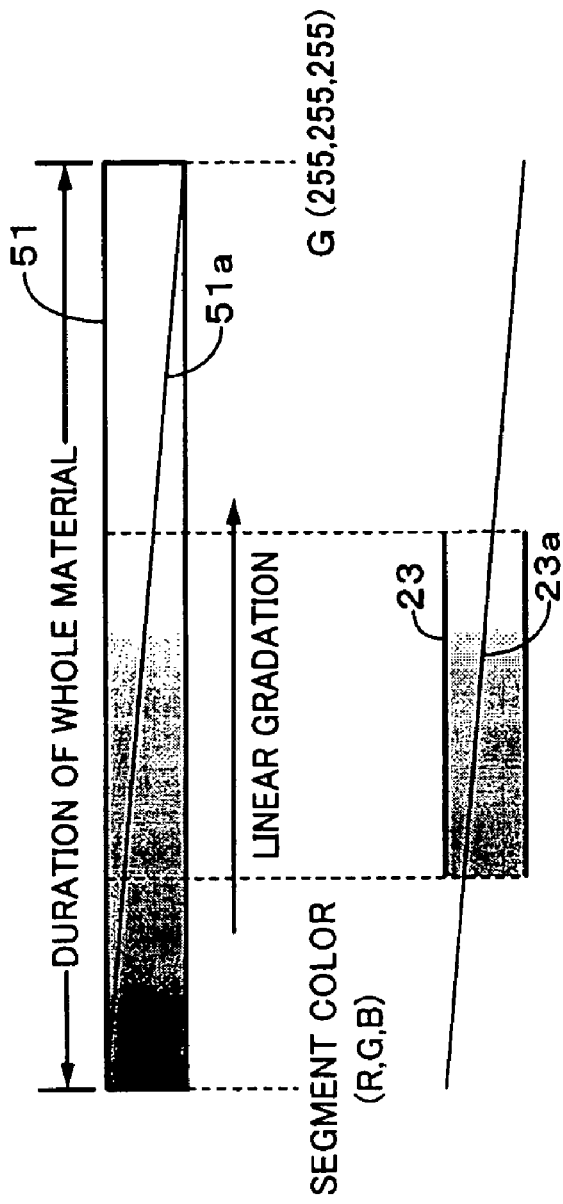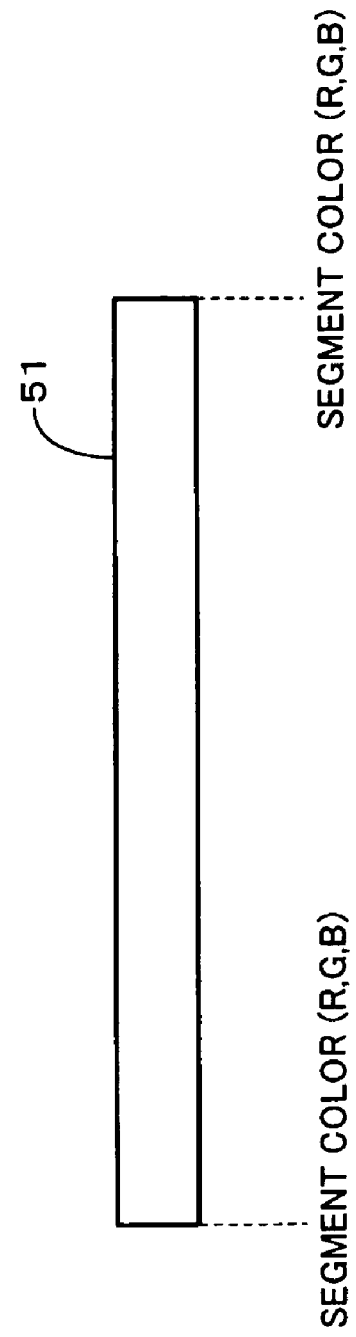
Fig. 11A
Fig. 11B
Fig. 11C

ND EDITING
PICTURE DISPLAYING METHOD, PICTURE DISPLAYING PROGRAM, AND EDITING APPARATUS

CROSS REFERENCES TO RELATED APPLICATIONS

The present invention contains subject matter related to Japanese Patent Application JP 2004-308050 filed in the Japanese Patent Office on Oct. 22, 2004, the entire contents of which being incorporated herein by reference.

BACKGROUND OF THE INVENTION

1. Field of the Invention

The present invention relates to a picture displaying method, a picture displaying program, and an editing apparatus that display mapping of a material to be displayed on a screen.

2. Description of the Related Art

In recent years, non-linear editing applications that operate on personal computers have been widely used. The application can edit materials on the basis of a graphical user interface (GUI). When a picture is edited, mapping of materials such as a moving picture, a sound, a still picture, and a subtitle (these materials are hereinafter referred to as clips) are laid out on the same screen, arranged in time series, and their order is defined. As a result, a final work (hereinafter referred to as a complete package) is created (see the following patent document).

FIG. 1A is a schematic diagram showing a segment 103 that is mapping of a whole clip. FIG. 1B is a schematic diagram showing a GUI screen for nonlinear editing of the related art. As shown in FIG. 1B, a plurality of tracks 101 that extend on time axis (the horizontal direction in FIG. 1B) appear on the GUI screen. A track 101 has a segment 102. As shown in FIG. 1A, the length of the segment 102 corresponds to the length of a used portion of the whole clip, namely the duration. When segments 102 are arranged in time series and the order thereof is defined, a complete package is created.

Clips of a moving picture, a sound, and so forth that compose a complete package have a time concept. Thus, when the user decides clips contained in a complete package, he or she needs to visually check which parts of which clips have been used.

However, in the related art, the operation the user visually checks clips contained in a complete package overburdens him or her. Although the length (namely, the duration) of a whole clip is displayed with the length of a segment, however, a used portion thereof is not displayed. This is because the user is incapable of intuitionally knowing whether a clip has been used from the beginning to a portion immediately preceded by the end or whether a clip has been used from the middle to the end.

To solve this problem, a method of displaying time information of segments on the GUI screen with characters has been proposed. For example, in FIG. 2, time of the beginning of a clip is 00:00:00:00 and time of a segment of the clip is "00:00:03:12->00:00:05:21".

[Patent Document 1] Japanese Patent Laid-Open Publication No. HEI 11-66815

SUMMARY OF THE INVENTION

However, when a used portion of a clip is displayed in a segment with characters, the following problems take place.

(1) The more the number of clips that compose a complete package increases (namely, the more the number of segments that are displayed on the GUI screen increases), the more the GUI screen becomes complicated and the more the user is impeded in obtaining necessary information.

(2) Since the display space for a segment is limited, it is difficult to fully display time information with characters. In particular, when a clip name, a thumbnail picture/icon, and so forth are displayed in a segment, since the space for time information becomes more narrow, it becomes more difficult to display time information in the segment.

(3) Although the relationship between a segment and a clip can be calculated according to the duration of the whole clip and time information that is displayed in the segment, the user is incapable of knowing where the segment is in the clip at a glance. In other words, the user is incapable of intuitionally knowing a segment exists at the front portion or the rear portion of the clip.

In view of the foregoing, it would be desirable to provide a picture displaying method, a picture displaying program, and an editing apparatus that allow the user to intuitionally know which part of a whole clip has been used without character information.

According to an embodiment of the present invention, there is provided a picture displaying method of arranging mapping corresponding to the whole or a part of a material that has a time concept in time series on a screen. Gradation is set to the mapping of the whole of the material. Gradation that is set to a region corresponding to the arranged mapping of the gradation that has been set to the whole of the material is added to the arranged mapping.

According to an embodiment of the present invention, there is provided a picture displaying program that causes a computer device to execute a picture displaying program of arranging mapping corresponding to the whole or a part of a material that has a time concept in time series on a screen. Gradation is set to the mapping of the whole of the material. Gradation that is set to a region corresponding to the arranged mapping of the gradation that has been set to the whole of the material is added to the arranged mapping.

According to an embodiment of the present invention, there is provided an editing apparatus that arranges mapping corresponding to the whole or a part of a material that has a time concept in time series on a screen and edits the mapping. The editing apparatus has a display section, a storage section, and a display control section. The display section displays information. The storage section stores a material that has a time concept. The display control section displays mapping corresponding to the whole or a part of a material that has a time concept on the display section. Gradation is set to mapping corresponding to the whole of the material and gradation that is set to a region corresponding to the arranged mapping of the gradation that has been set to the mapping corresponding to the while of the material to the arranged mapping.

As described above, according to an embodiment of the present invention, when mapping of a part of a material is displayed, gradation added to the part of the whole material is added to the mapping of the part of the material, the degree of the gradation added to the mapping allows the user to intuitionally know which part of the whole clip the mapping is.

These and other objects, features and advantages of the present invention will become more apparent in light of the following detailed description of a best mode embodiment thereof, as illustrated in the accompanying drawings.

BRIEF DESCRIPTION OF THE DRAWINGS

The invention will become more fully understood from the following detailed description, taken in conjunction with the accompanying drawings, wherein similar reference numerals denote similar elements, in which:

FIG. 2 is an editing screen that describes non-linear editing of the related art;

FIG. 3 is a block diagram showing an example of the structure of an editing apparatus according to a first embodiment of the present invention;

FIG. 4A is a schematic diagram showing an example of a segment that is mapping of a whole clip;

FIG. 4B is a schematic diagram showing an example of a regular GUI screen;

FIG. 7A is a schematic diagram showing an example of a segment corresponding to a whole clip that has a time concept;

FIG. 7B is a schematic diagram showing an example of a segment corresponding to a part of a clip that has a time concept;

FIG. 7C is a schematic diagram showing an example of a segment of a clip that does not have a time concept;

FIG. 11A is a schematic diagram showing an example of a segment corresponding to a whole clip that has a time concept;

FIG. 11B is a schematic diagram showing an example of a segment corresponding to a part of a clip having a time concept;

FIG. 11C is a schematic diagram showing an example of a segment of a clip that does not have a time concept;

DETAILED DESCRIPTION OF THE PREFERRED EMBODIMENTS

Figures 1A, 1B:
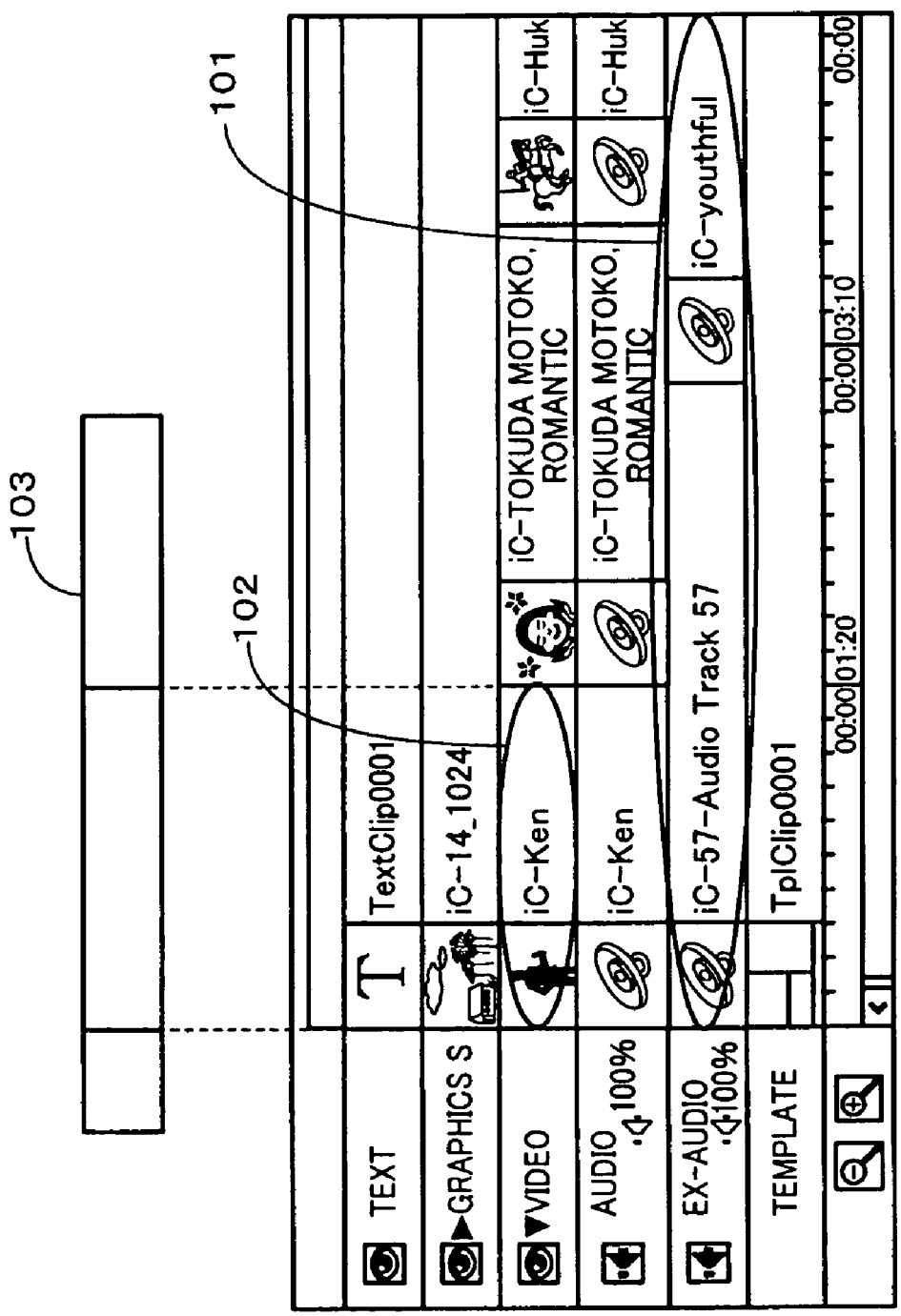
FIG. 1 is an editing screen that describes non-linear editing of the related art.

FIG. 3 is a block diagram showing an example of the structure of an editing apparatus 1 according to a first embodiment of the present invention. In FIG. 3, only principal sections are shown and will be described. A central processing unit (CPU) 2, a graphic section 4, an input device 7, a read only memory (ROM) 8, and a hard disk drive 9 are connected to a bus 10. A dynamic random access memory (DRAM) 3 that is a work memory is connected to the CPU 2. A video RAM (VRAM) 5 is connected to the graphic section 4. An output of the graphic section 4 is supplied to a display unit 6.

This embodiment of the present invention is suitable to a time line editing function of a nonlinear editing application on the basis of the GUI. The time line editing function is a function that lays out mapping of the whole and/or a part of each clip on the screen, defines the order thereof in time series, and creates a complete package.

The CPU 2 uses the DRAM 3 as a frame buffer to perform predetermined processes such as a reduction process for picture data. The CPU 2 reads the processed picture data from the DRAM 3 and supplies the processed picture data to the graphic section 4 through the bus 10. The graphic section 4 has a graphic control chip that designates horizontal and vertical scanning frequencies, namely the display resolution, of the display unit 6 and executes a drawing command received from the CPU 2. Picture data supplied to the graphic section 4 are written to the VRAM 5. The picture data written to the VRAM 5 are read by the graphic section 4 corresponding to the designated horizontal and vertical scanning frequencies and supplied as digital video signals to the display unit 6. In other words, the contents stored in the VRAM 5 directly affect data that are displayed on the display unit 6.

The input device 7 is a device that inputs commands and information to the editing apparatus 1. The input device 7 is composed of for example a pointing device (for example, a mouse) and a keyboard. With the input device 7, a cursor can be moved on the GUI screen that is displayed on the display unit 6 and a menu can be selected on the GUI screen.

The ROM 8 stores a program and so forth that activate the editing apparatus 1. The HDD 9 stores an editing program and data and information of an audio clip, a video clip, and a text clip. The editing program lays out mapping of the whole and/or a part of each clip on the screen, defines the order thereof in time series, and creates a complete package.

Next, the GUI screen of the editing apparatus 1 according to the first embodiment of the present invention will be described. First, to allow the reader of this specification to easily understand the present invention, a regular GUI screen on which the time line editing is performed will be described. FIG. 4A is a schematic diagram showing a segment 51 that is mapping of a whole clip. FIG. 4B is a schematic diagram showing an example of a regular GUI screen 21. The right side of the GUI screen 21 is omitted because of a limited drawing space.

As shown in FIG. 4B, a plurality of stripe-shaped tracks 22 are arranged on the GUI screen 21. A segment 23 is displayed in each track 22. As shown in FIG. 4A, the length of the segment 23 corresponds to the length, namely the duration, of a used portion of the whole clip.

A time ruler 24 and a scroll bar 25 are displayed below the tracks 22. A time cursor 28 is displayed on the GUI screen 21. The time cursor 28 moves in the time direction (from left to right in FIG. 4B) on the plurality of tracks 22 when clips are reproduced.

A track name display portion 26 that represents a track name is displayed on the forward side of each track 22. Time scale up/down icons 27 are displayed below a plurality of track name display portions 26.

In this example, only a time line window is displayed as the GUI screen 21 on which the time line editing is performed. Instead, various types of windows and so forth may be displayed. For example, a project window for a list of materials such as a video clip, an audio clip, and so forth that are edited, a monitor window for a preview of a video clip, a command palette for a menu of various commands for picture and audio processes, an information palette for information of a mouse pointer and clips, and so forth may be displayed. Next, each portion of the GUI screen 21 will be described in detail.

Track Name Display Portion

The track name display portion 26 displays a track name that represents the type of a track 22. The track name display portion 26 has an icon that represents the type of a clip. For example, the track name display portion 26 of the track 22 that has a segment of a video clip such as text, a still picture, or a moving picture has for example a human-eye-shaped icon. On the other hand, the track name display portion 26 that has a segment of an audio clip has a speaker-shaped icon.

Segment

A segment 23 is mapping of a desired duration of a clip used for a complete package. The mapping is displayed in the track 22. The length (the number of pixels) in the horizontal direction of a segment displayed in the track 22 depends on the time scale displayed on the time ruler 24 and the duration of the segment 23.

Figure 5:
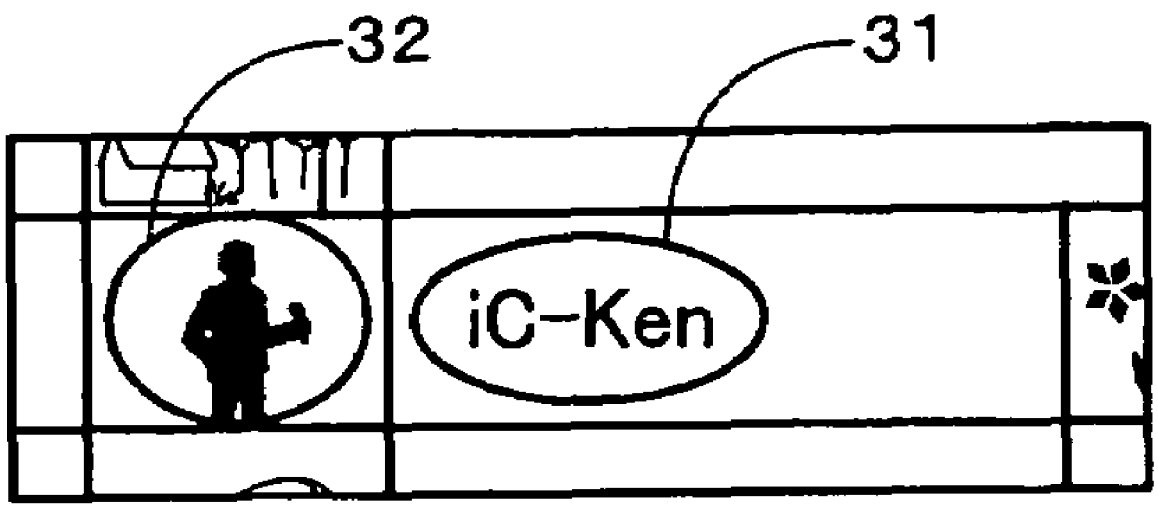
FIG. 5 is a schematic diagram showing an example of a segment that is displayed.

FIG. 5 is a schematic diagram showing an example of a segment that appears on the GUI screen. As shown in FIG. 5, information such as a clip name 31, a thumbnail picture/icon 32, and so forth are displayed in the segment 23. The clip name 31 is a clip name assigned to a clip. The thumbnail picture/icon 32 is a picture that represents a clip.

When a clip is a text clip, the thumbnail picture/icon 32 is a character or a picture that represents that the clip is a text clip for example character "T". When a clip is a still picture clip, the thumbnail picture/icon 32 is a reduced still picture. When a clip is a video clip, the thumbnail picture/icon 32 is a reduced picture of one frame of the video clip. When a clip is an audio clip, the thumbnail picture/icon 32 is a character or a picture that represents the audio clip for example a speaker-shaped picture. When a clip is a template clip, the thumbnail picture/icon 32 is for example a picture that represents a divided screen as a template.

Track

The track 22 is a region for a segment 23. Tracks 22 are formed for individual material types. Material types are for example moving picture, audio, still picture, and so forth. A track 22 has a segment 23 of the same material type as the track 22.

Time Cursor

The time cursor represents the current position on the time line. For example, a preview and other information are displayed at the current position of the time cursor. An editing operation is performed for a segment 23 at the position of the time cursor. The time cursor can be used in various manners that depend on the specification.

Time Ruler

The time ruler is a scale that represents time on the time line. Whether one scale represents one frame, five frames, one second, or the like can be changed by setting of the time scale (that will be described later).

Time Scale Up/Down Icons

The time scale up/down icons 27 designate the time scale of the time line. The length of time of the time line can be changed by setting the time scale. For example, when one scale of the time ruler represents five frames, the screen can display a longer time range than when represents one frame. However, when one scale of the time ruler represents one second, it becomes difficult for the user exactly to operate the time cursor and know the length of a segment. Thus, it is preferred that the time scale be properly adjusted by the time scale up/down icons 27 according to the edit process.

Scroll Bar

The scroll bar 25 scrolls a plurality of tracks 22 in the forward time direction and the reverse time direction to allow the user to watch the tracks that are hidden from the window. The scroll bar 25 has a rod-shaped frame 25a and a scroll box 25b that is displayed in the frame 25a. When the scroll box 25b is dragged and moved to left and right, the tracks 22 can be scrolled to left and right.

Figures 6A, 6B:
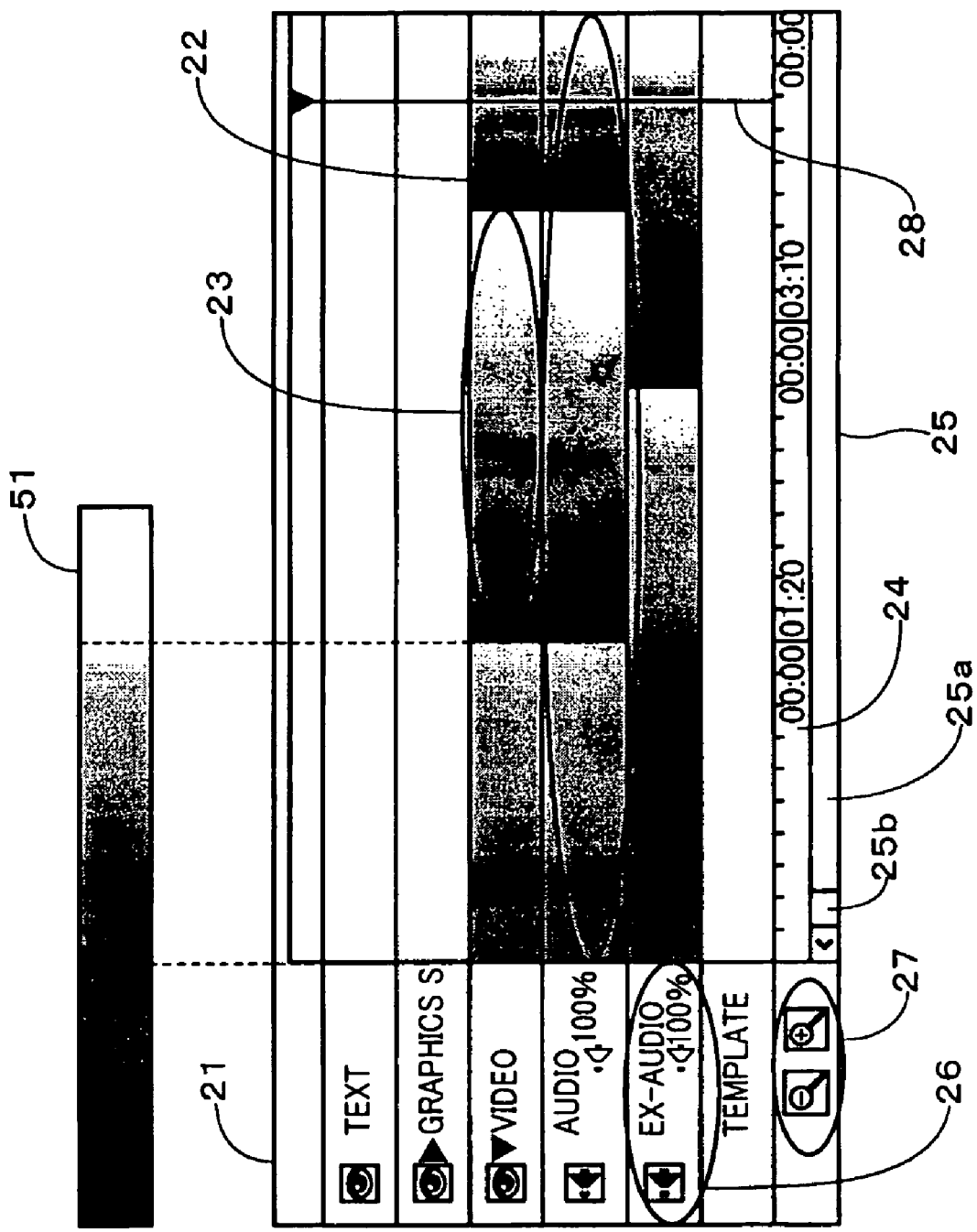
FIG. 6A is a schematic diagram showing an example of a segment according to the first embodiment of the present invention.
FIG. 6B is a schematic diagram showing an example of the GUI screen according to the first embodiment of the present invention.

FIG. 6A is a schematic diagram showing an example of a segment 51 that is mapping of a whole clip. FIG. 6B is a schematic diagram showing an example of the GUI screen 21 of the editing apparatus 1 according to the first embodiment of the present invention. On the GUI screen 21, a segment 23 as mapping of a clip that does not have a time concept differs from that of a clip that has a time concept. In other words, a segment 23 that is mapping of the whole or a part of a clip that has a time concept has gradation from the beginning to the end in the time direction. In contrast, a segment 23 that is mapping of the whole or a part of a clip that does not have a time concept has a monotone color (hereinafter referred to as a solid color). Since the appearance of segments 23 varies depending on whether it has a time concept, the user can intuitionally know which segment 23 has a time concept.

A clip that does not have a time concept is for example a still picture or a subtitle (displayed at a fixed position, which is a content (such as a picture, a sound, characters, or the like) that does not vary as time elapses. A clip that has a time concept is for example a moving picture, a sound, a subtitle with motion, or the like, which is a content that varies as time elapses. The gradation is a tone or shading that gradually varies. The beginning of the segment 23 is a temporally earlier end, whereas the end of the segment 23 is a temporarily later end.

According to the first embodiment of the present invention, gradation added to a segment 23 corresponding to a part of a clip is gradation added to a region of the part of the clip of gradation added to a segment 51 corresponding to the whole of the clip. The degree of the gradation allows the user to intuitionally know which part of the clip the segment 23 is.

It is preferred that linear gradation whose tint or tone linearly varies be used because the user can accurately know which part of a clip the segment 23 is.

FIG. 7A is a schematic diagram showing an example of a segment 23 corresponding to the whole of a clip that has a time concept. FIG. 7B is a schematic diagram showing an example of a segment 23 corresponding to a part of a clip that has a time concept. FIG. 7A and FIG. 7B show examples of which gradation that gradually becomes whitish in the time direction is added to the segment 23. Although the color of gradation from one end to the other end is not limited to white, it is preferred that a color that can easily identify all segments 23 on the GUI screen 21 be used. In other words, when gradation is added to the segment 23 shown in FIG. 6B, it is preferred that a color that is complement to all segment colors on the GUI screen 21 shown in FIG. 4B be used as the color of gradation from one end to the other end.

When a segment 23 corresponding to the whole of a clip that has a time concept is displayed in a track 22, as shown in FIG. 7A, gradation is added to the segment 23 so that the segment color of the segment 23 gradually becomes whitish from the beginning to the end, namely in the backward direction on the time axis. Specifically, RGB values vary from the beginning (R, G, B) to the end (255, 255, 255).

When a segment 23 corresponding to a part of a clip having a time concept is displayed in a track 22, as shown in FIG. 7B, gradation is added to the segment 23 so that the color of a segment 51 at the position corresponding to the beginning of the segment 23 becomes the color of the beginning of the segment 23 and the color of the segment 51 at the position corresponding to the end of the segment 23 becomes the color of the end of the segment 23. With this gradation, the user can know that when the end (right end of FIG. 7B) of the segment 23 is white, the segment 23 corresponds to the end of the clip.

FIG. 7C is a schematic diagram showing an example of a segment 23 of a clip that does not have a time concept. When a segment 23 of a clip that does not have a time concept is displayed in a track 22, a solid color is added to the segment 23. Specifically, the segment 23 has constant RGB values (R, G, B) from the beginning to the end.

Figure 8:
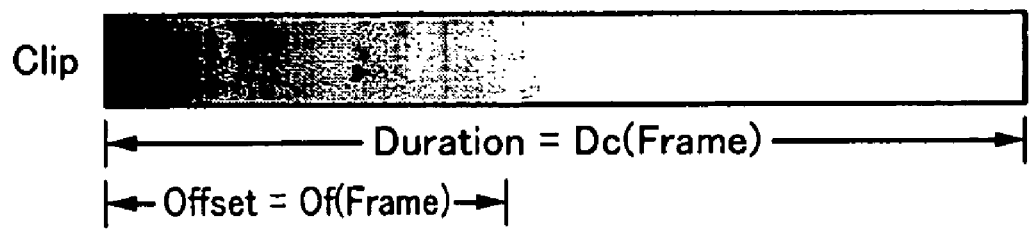
FIG. 8 is a schematic diagram describing an example of a method of calculating RGB values of a segment.

Next, an example of a method of calculating RGB values of a segment 23 will be described. FIG. 8 is a schematic diagram describing an example of the method of calculating RGB values of the segment 23. As shown in FIG. 8, when the duration of the whole clip is denoted by Dc (Frame), the beginning of the whole clip on the time axis is denoted by 0, the offset position from the beginning is denoted by Of (Frame), and the original RGB values (100%) are denoted by (Ro, Go, Bo), the RGB values Of (R, G, B) at the offset position Of are expressed by formula 1.

$$Of(R, G, B) = \left( \frac{(255 - Ro)xOf}{Dc} + Ro, \frac{(255 - Go)xOf}{Dc} + Go, \frac{(255 - Bo)xOf}{Dc} + Bo, \right) \quad (1)$$

With formula (1), RGB values at any frame position can be obtained.

Figure 9:
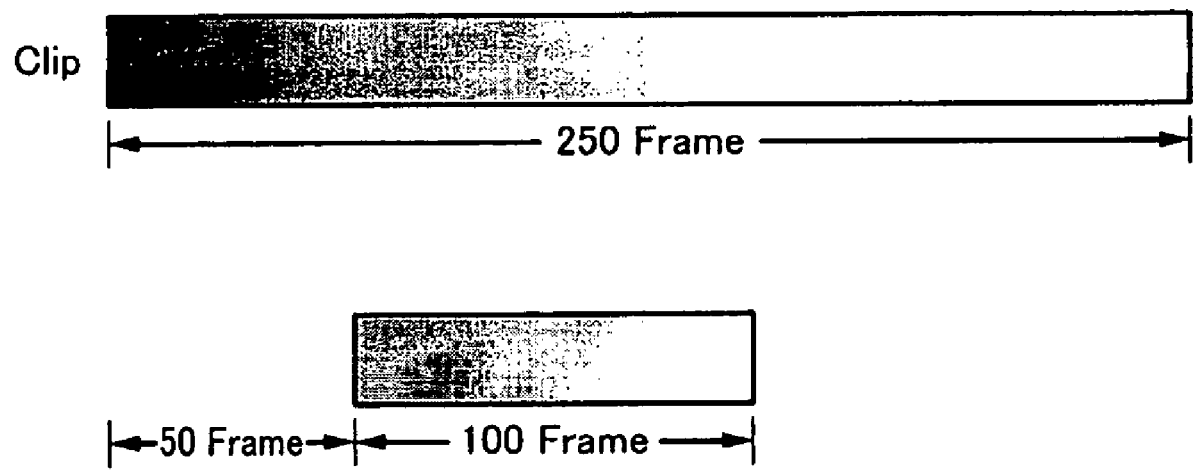
FIG. 9 is a schematic diagram describing an example of a method of calculating RGB values of a segment.

Next, the method of obtaining the RGB values will be more specifically described. FIG. 9 is a schematic diagram specifically describing the method of calculating the RGB values. In this example, it is assumed that the duration of a clip is 250 frames, the offset of a segment 23 is 50 frames, the duration of the segment 23 is 100 frames, and the RGB values at 100% are (51, 153, 102).

With formula (1), RGB values Of (R, G, B) at the beginning of the segment are calculated as follows.

$$R = \frac{(255 - 51)x50}{255} + 51 = 91$$

$$G = \frac{(255 - 153)x50}{250} + 153 = 73$$

$$B = \frac{(255 - 102)x50}{250} + 102 = 132$$

The calculated results have been rounded off.

Specifically, it is necessary to develop data to the VRAM 5 pixel by pixel to display a picture on the display unit 6. Thus, it is necessary to convert formula (1) into the pixel format.

When the number of pixels per frame displayed on the screen is denoted by Rp (pixels/frame), the pixel position OfP at the offset position Of can be expressed as follows.

$$OfP = OfxRp \quad (2)$$

Thus, the RGB values OfP (R, G, B) at the pixel position OfP can be expressed as follows.

$$OfP(R, G, B) = \left( \frac{(255 - Ro)xOfP}{DcxRp} + Ro, \frac{(255 - Go)xOfP}{DcxRp} + Go, \frac{(255 - Bo)xOfP}{DcxRp} + Bo, \right) \quad (3)$$

With the duration 51 of a segment corresponding to the whole of a clip, the reference position of the clip, and the number of pixels per frame, the RGB values of each pixel of the segment 23 can be calculated. The number of pixels per frame can be calculated according to the time scale on the time line. This calculation is performed by the CPU 2. The calculated result of the CPU 2 is written to the VRAM 5. Whenever the length of the segment 23 is changed, the calculation is performed and the calculated result is written to the VRAM 5.

Next, an example of a segment display operation of the editing apparatus 1 according to the first embodiment of the present invention will be described. The HDD 9 of the editing apparatus 1 has stored various clips such as a video clip and an audio clip to be edited and data about the clips before the editing operation is performed.

Examples of data about various clips are as follows.

(1) Durations
(2) Clip names
(3) Time codes at default In/Out points
(4) Material file paths
(5) Information (video format, audio format, picture size, and so forth) recorded in other material files An icon or a thumbnail of a clip that is displayed on a predetermined window or the like that manages clips is dragged and dropped on a track 22 on the time line. Thus, a segment 23 corresponding to the dropped icon or thumbnail is generated and displayed. Gradation that extends in the time direction is added to the segment 23 corresponding to the RGB values of each pixel obtained by the foregoing calculation method.

When the segment 23 is generated, data of the segment 23 are formed with reference to the clip. Examples of data of the segment 23 are as follows.

(1) Identifier of clip
(2) Clip name of clip
(3) Duration of clip
(4) Reference position of clip (information that represents the position at which the clip has been used)
(5) Others, information of a clip displayed in a segment The reference position of the clip is for example time codes of default in/out points of the clip.

When a desired portion is selected from the whole of a clip with the time cursor 28 and the length of the segment 23 is decreased, as shown in FIG. 7B, gradation is added to the segment 23 so that the color of the segment 51 at the position corresponding to the beginning of the segment 23 becomes the color at the beginning of the segment 23 and the color of the segment 51 at the position corresponding to the end of the segment 23 becomes the color at the end of the segment 23. In addition, data about the segment 23 are changed. The RGB values of each pixel used to display gradation are calculated by for example the foregoing calculation method.

In the editing apparatus 1 according to the first embodiment of the present invention, the regular GUI screen (see FIG. 4B) of which information of the thumbnail picture/icon 32 and so forth are displayed in the segment 23 and the GUI screen (see FIG. 6B) of which gradation is added to the segment 23 may be switchable. For example, a first display mode that displays gradation on the segment 23 and a second display mode that displays information of the thumbnail picture/icon 32 and so forth on the segment 23 may be provided. The first display mode and the second display mode may be switchable. In this case, the display modes that are switched may be triggered by a user's operation of a mode selection button on the GUI screen or a short cut key, a command execution from a menu, or the like.

Next, a second embodiment of the present invention will be described. According to the first embodiment, gradation is added to a segment. On the other hand, according to the second embodiment, in addition to gradation, a diagonal line is added to a segment.

Since the structure of the editing apparatus of the second embodiment is the same as that of the first embodiment, sections of the second embodiment corresponding to those of the first embodiment are denoted by the same reference numerals.

Figure 10A:
FIG. 10A is a schematic diagram showing an example of a segment according to a second embodiment of the present invention.
Figure 10B:
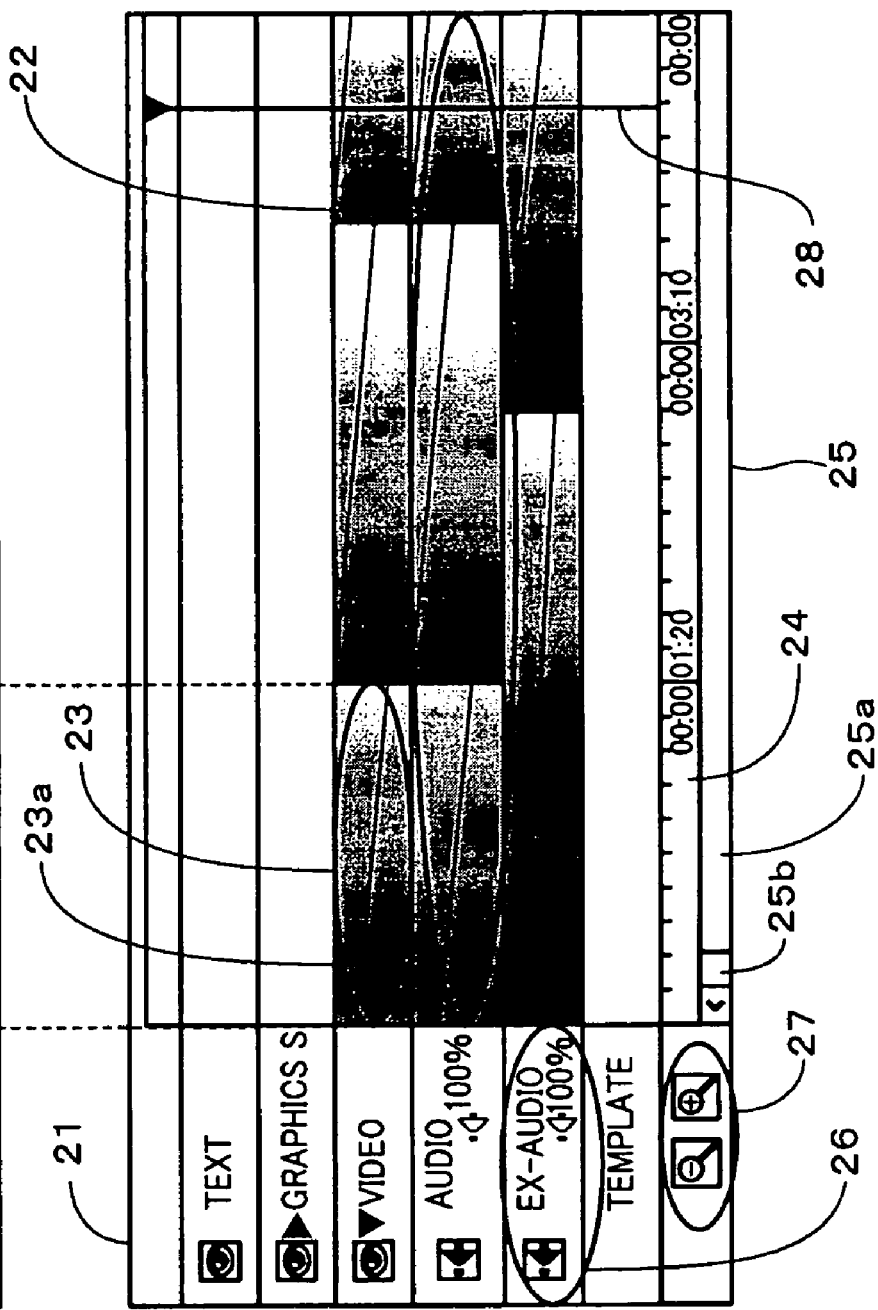
FIG. 10B is a schematic diagram showing an example of a GUI screen according to the second embodiment of the present invention.

FIG. 10A is a schematic diagram showing an example of a segment 51 that is mapping of the whole of a clip. FIG. 10B is a schematic diagram showing an example of a GUI screen 21 of the editing apparatus 1 according to the second embodiment of the present invention. FIG. 11A is a schematic diagram showing an example of a segment 23 corresponding to the whole of a clip that has a time concept. FIG. 11B is a schematic diagram showing an example of a segment 23 corresponding to a part of a clip that has a time concept.

When a segment 23 corresponding to the whole of the clip having a time concept is displayed in a track 22, as shown in FIG. 11A, gradation is added to the segment 23 that has a rectangular shape so that the gradation extends from the beginning to the end of the segment 23. In addition, a diagonal line 23a that extends in the lower right direction on the time axis, namely a straight line that connects the upper left corner and the lower right corner of the segment 23, is added to the segment 23 (this straight line is hereinafter referred to as a progress line).

When the segment 23 corresponding to a part of a clip having a time concept is displayed in a track 22, gradation is added to the segment 23 so that the color of the segment 51 at the position corresponding to the beginning of the segment 23 becomes the color at the beginning of the segment 23 and the color of the segment 51 at the position corresponding to the end of the segment 23 becomes the color at the end of the segment 23.

In addition, a diagonal line 51a is added to the segment 23 so that the position of the diagonal line 51a corresponding to the beginning of the segment 23 becomes the beginning of the straight line 23a and the position of the diagonal line 51a corresponding to the end of the segment 23 becomes the end of the straight line 23a of the segment 23.

Since gradation of the second embodiment is the same as that of the first embodiment, the description will be omitted. In the following, only the diagonal line 23a added to the segment 23 will be described.

Figure 12:
FIG. 12 is a schematic diagram describing an example of a method of displaying a progress line.

FIG. 12 is a schematic diagram describing an example of a method of displaying a progress line. As shown in FIG. 12, when the length of the segment 51 corresponding to the whole of the clip is denoted by L, the width of the segment 51 is denoted by D, the lower end of the beginning of the segment 51 corresponding to the whole of the clip is represented by the origin, the horizontal direction is represented by the y axis, the vertical direction is represented by the x axis, the progress line can be expressed by formula (4)

$$y = -\frac{D}{L}x + D \tag{4}$$

Thus, when the beginning of the segment 23 corresponding to a part of the clip is denoted by $l_1$ and the end of the segment 23 corresponding to the part of the clip is denoted by $l_2$, the progress line corresponding to the part of the clip can be expressed by formula (5).

$$y = -\frac{D}{L}x + D \tag{5}$$
$$l_1 \leq x \leq l_2$$

For example, the CPU 2 obtains the coordinates using formula (5) and sends a drawing command corresponding to the coordinates to a video chip. The video chip creates drawing data corresponding to the drawing command received from the CPU 2 and outputs the drawing data to the display unit 6. The diagonal line 23a corresponding to the drawing data is added to the segment 23. Whenever the length of the segment 23 is changed, the drawing data are changed. The diagonal line 23a corresponding to the changed drawing data is added to placed on the segment 23.

Since the gradation and the diagonal line 23a such as the progress line are added to the segment 23, when the user glances at the gradation and the degree of the slope of the diagonal line 23a, he or she can more accurately and intuitionally know whether the segment 23 corresponds to the whole or which part of the clip than the first embodiment. When the diagonal line 23a reaches for example the end corner of the segment 23, it is clear that the segment 23 extends to the end of the clip. Thus, the GUI screen 21 becomes very simple, not crowded.

It is preferred that the color of the diagonal line be the same as the color at the beginning (left end of FIG. 11B) of the gradation added to the segment 23 of the clip. For example, the color of the diagonal line is a sold color. When the color is a solid color, if the diagonal line 23a such as a progress line does not appear at the left end, it is clear that the segment 23 corresponds to the beginning of the whole of the clip. In addition, since the color of the diagonal line 23a is a solid color, the visuality of the diagonal line 23a can be improved.

FIG. 11C is a schematic diagram showing an example of a segment 23 that does not have a time concept. As shown in FIG. 11C, the segment 23 of the clip that does not have a time concept is displayed in the same manner as that of the first embodiment. Thus, the description of the segment 23 of a clip that does not have a time concept will be omitted.

Next, an example of the segment display operation of the editing apparatus 1 according to the second embodiment of the present invention will be described. When gradation is added to the segment 23, since the segment display operation is the same as that of the first embodiment except that a diagonal line is displayed in the segment 23, the description will be omitted.

In the editing apparatus 1 of the second embodiment of the present invention, the regular GUI screen of which information of the thumbnail picture/icon 32 and so forth is displayed in the segment 23 and the GUI screen of which gradation and a diagonal line are added to the segment 23 may be switchable. For example, a first display mode in which gradation and a diagonal line are added to the segment 23 and a second display mode in which information such as the thumbnail picture/icon 32 and so forth is displayed in the segment 23 may be provided. The first display mode and the second display mode may be switchable. In this case, the display modes that are switched may be triggered by a user's operation of a mode selection button on the GUI screen or a short cut key, a command execution from a menu, or the like.

In the editing apparatus 1 of the second embodiment of the present invention, both gradation and a diagonal line are added to the segment 23, only a diagonal line may be added to the segment 23. Instead, the user may be able to select either gradation or a diagonal line that is added to the segment 23. For example, the user may be able to select a first mode in which gradation is added to the segment 23 or a second mode in which a diagonal line is added to the segment 23 with an input device.

Next, a third embodiment of the present invention will be described. According to the third embodiment, various types of information such as a thumbnail picture and a clip name pass through gradation so that the user can watch and check the gradation and the various types of information at a time.

Since the structure of the editing apparatus of the third embodiment is the same as that of the first embodiment, the description will be omitted. Sections of the third embodiment corresponding to those of the first embodiment are denoted by the same reference numerals.

Figures 13A, 13B:
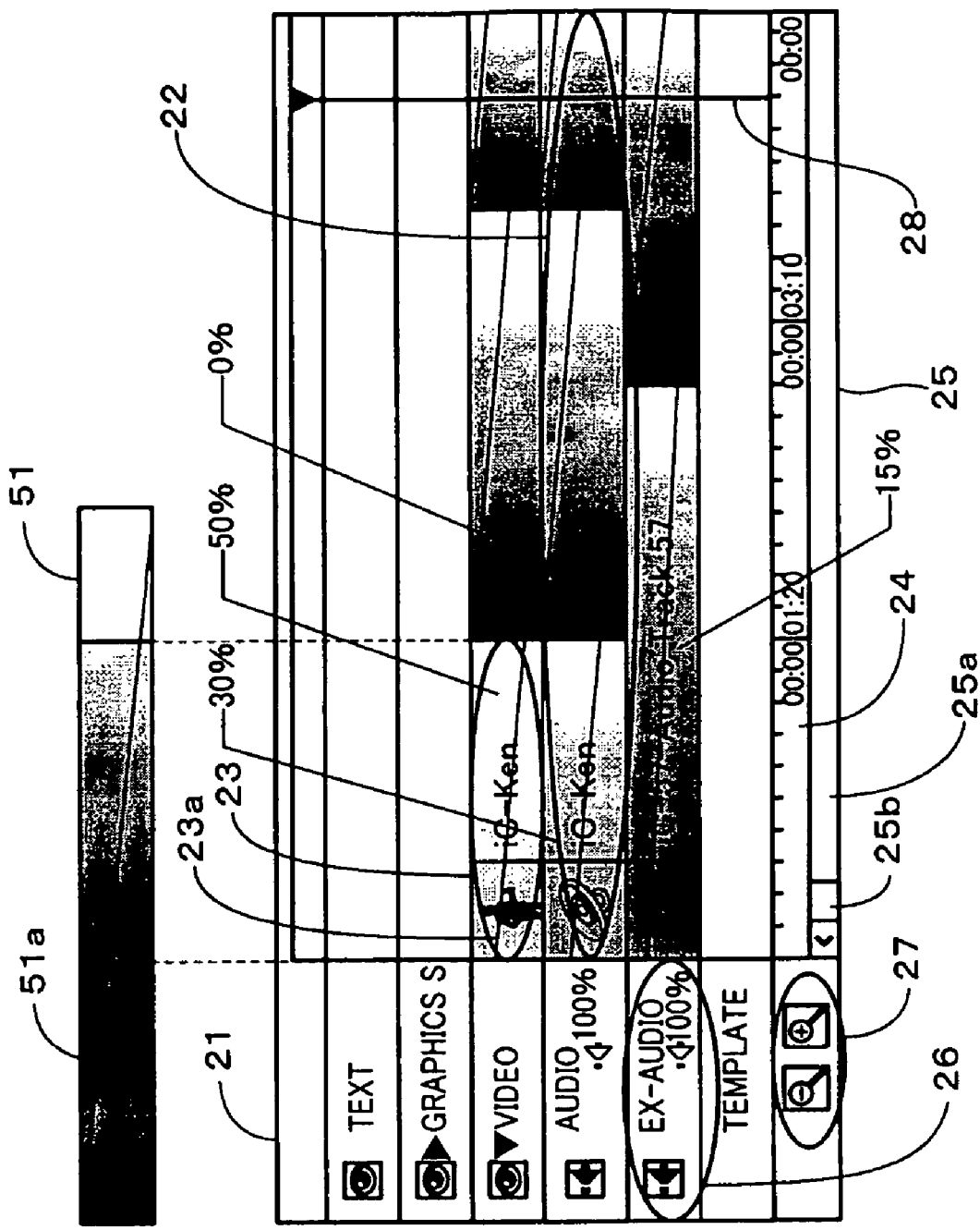
FIG. 13A is a schematic diagram showing an example of a segment according to a third embodiment of the present invention.
FIG. 13B is a schematic diagram showing an example of a GUI screen according to a third embodiment of the present invention.

Next, a GUI screen of the editing apparatus 1 according to the third embodiment of the present invention will be described. FIG. 13A is a schematic diagram showing an example of a segment 51 that is mapping of a whole clip. FIG. 13B is a schematic diagram showing an example of a GUI screen 21 of the editing apparatus 1 according to the third embodiment of the present invention.

Information such as a thumbnail picture and a clip name is displayed in a segment 23 so that the information pass through gradation. As a result, the user can watch the degree of gradation and information such as a thumbnail picture and a clip name at a time. Thus, in comparison with the structure of which the regular GUI screen of which information such as the thumbnail picture/icon 32 is displayed in the segment 23 and the GUI screen of which gradation is added to the segment 23 are switchable, the user's time line editing operation becomes easy.

Although such information may be able to pass through both gradation and a diagonal line, from a view point of improvement of the visuality of the diagonal line, it is preferred that the transparency of the diagonal line be 0%. In addition, according to the third embodiment of the present invention, a diagonal line 23a is added to the segment 23. Instead, the diagonal line 23a may be omitted.

FIG. 13B shows segments 23 whose transparencies are 0%, 15%, 30%, and 50%. When the transparency of gradation of a segment is 100%, the segment is transparent. FIG. 13B shows that the higher the transparency of gradation, the more difficultly the user identifies the degree of gradation. When the transparency of gradation is around 15%, FIG. 13B shows that the user can easily identify the gradation and check a clip name and a thumbnail picture. From this point of view, it is preferred that the transparency of the segment 23 be around 15% and information such as a clip name and a thumbnail picture be displayed in the segment 23. These values of transparencies are examples.

Next, an example of a segment display operation of the editing apparatus 1 according to the third embodiment of the present invention will be described. Except that when a segment 23 is displayed in a track 22 or the length of the segment 23 is changed, the segment 23 is displayed so that various types of information such as a thumbnail picture and a clip name passes through gradation, the segment display operation of the third embodiment is the same as that of the first embodiment. Thus, in the following, an operation that processes a picture so that various types of information such as a thumbnail picture and a clip name passes through gradation will be described.

Figure 14:
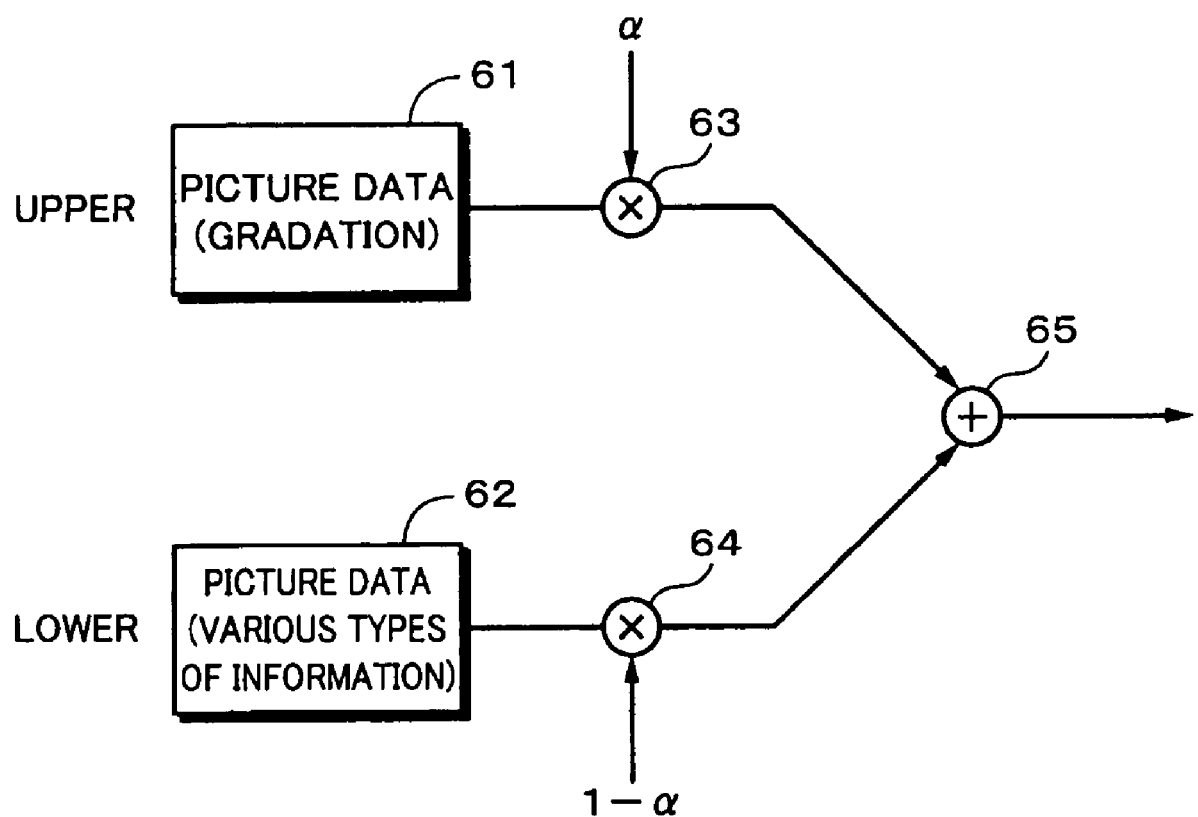
FIG. 14 is a block diagram describing a combining process operation of a CPU.

FIG. 14 is a block diagram showing an example of the structure of a transparent picture process section. The transparent picture process section performs a picture process that allows the user to watch various types of information such as a thumbnail picture and a clip name that passes through gradation. The function of the segment display section can be executed by for example the CPU 2 or the graphic section 4 of the editing apparatus 1.

A multiplication device 63 multiplies each pixel of picture data 61 as gradation that is an upper picture by opacity $\alpha$. A multiplication device 64 multiplies each pixel of picture data 62 as various types of information that is a lower picture by $\alpha - 1$. Opacity $\alpha$ ranges from 0 to 1. An addition device 65 adds the upper picture and the lower picture pixel by pixel and outputs the added data. A segment 23 is displayed in a track 22 corresponding to the added output data. When opacity $\alpha$ is changed, the transparency of gradation can be changed.

In the editing apparatus 1 of the third embodiment, the user may be able to designate the transparency of the segment 23. Instead, the user may be able to select whether the segment 23 is transparent.

In the editing apparatus 1 of the third embodiment, both gradation and a diagonal line are added to a segment. Instead, either gradation or a diagonal line may be added to a segment. In addition, the user may be able to select one of gradation and a diagonal line that is added to a segment. For example, the user may be able to select a first mode of which gradation is added to a segment or a second mode of which a diagonal line is added to gradation with the input device 7.

Although the first to third embodiments of the present invention were described, the present invention is not limited to the first to third embodiment, but can be applied to various modifications based on the spirit and scope of the present invention.

The numeric values described in the first to third embodiments are just examples. When necessary, different values may be used.

An embodiment of the present invention may be applied to for example nonlinear application software that has a time line editing function, application software that creates one complete package with a plurality of content materials arranged in time series, and application software that uses a part or the whole of a material that has a time concept.

According to the first to third embodiments, a segment corresponding to performance command information such as music instrument digital interface (MIDI) data may be displayed in a track.

The first to third embodiments are applied to an editing apparatus that edits picture data and so forth. However, the present invention is not limited to such examples. Instead, an embodiment of the present invention may be applied to an editing apparatus that edits music.

It should be understood by those skilled in the art that various modifications, combinations, sub-combinations and alternations may occur depending on design requirements and other factors insofar as they are within the scope of the appended claims or the equivalents thereof.

What is claimed is:

1. A picture displaying method of arranging mapping corresponding to the whole or a part of a material that has a time concept in time series on a screen, comprising the steps of:
   setting gradation, utilizing a setting unit, to the mapping of the whole of the material; and
   adding gradation, utilizing an adding unit, that is set to a region corresponding to the arranged mapping of the gradation that has been set to the whole of the material to the arranged mapping,
      wherein the mapping has a rectangular shape,
   adding, utilizing the adding unit, a part of a diagonal line added to the region corresponding to the arranged mapping of a diagonal line of the mapping corresponding to the whole of the material to the arranged mapping,
   setting, utilizing the setting unit, color of the diagonal line for determining whether the region corresponds to the whole or which part of the material,
      wherein the color at the beginning of the gradation that has been set to the mapping corresponding to the whole of the material is the same as the color of the region corresponding to the arranged mapping of a diagonal line of the mapping corresponding to the whole of the material.

2. The picture displaying method as set forth in claim 1, wherein the gradation added to the mapping has transparency.

3. The picture displaying method as set forth in claim 1, wherein the picture displaying method has a first display mode of which the gradation is added to the arranged mapping and a second display mode of which the gradation is not added to the arranged mapping.

4. A computer-readable memory storing a picture displaying program that causes a computer device to execute a picture displaying program of arranging mapping corresponding to the whole or a part of a material that has a time concept in time series on a screen, the computer-readable memory being operatively coupled to the computer device, the program comprising the steps of:
   setting gradation to the mapping of the whole of the material;
   adding gradation that is set to a region corresponding to the arranged mapping of the gradation that has been set to the whole of the material to the arranged mapping; and
   adding a part of a diagonal line added to the region corresponding to the arranged mapping of a diagonal line of the mapping corresponding to the whole of the material to the arranged mapping;
   setting color of the diagonal line for determining whether the region corresponds to the whole or which part of the material,
      wherein the color at the beginning of the gradation that has been set to the mapping corresponding to the whole of the material is the same as the color of the region corresponding to the arranged mapping of a diagonal line of the mapping corresponding to the whole of the material.

5. The picture displaying program as set forth in claim 4, wherein the gradation added to the mapping has transparency.

6. The picture displaying program as set forth in claim 4, wherein the picture displaying method has a first display mode of which the gradation is added to the arranged mapping and a second display mode of which the gradation is not added to the arranged mapping.

7. An editing apparatus that arranges mapping corresponding to the whole or a part of a material that has a time concept in time series on a screen and edits the mapping, comprising:
   display means for displaying information;
   storage means for storing a material that has a time concept;
   display control means for displaying mapping corresponding to the whole or a part of a material that has a time concept on the display means,
   wherein gradation is set to mapping corresponding to the whole of the material and gradation that is set to a region corresponding to the arranged mapping of the gradation that has been set to the mapping corresponding to the while of the material to the arranged mapping; and
   means for adding a part of a diagonal line added to the region corresponding to the arranged mapping of a diagonal line of the mapping corresponding to the whole of the material to the arranged mapping;
   means for setting color of the diagonal line for determining whether the region corresponds to the whole or which part of the material,
      wherein the color at the beginning of the gradation that has been set to the mapping corresponding to the whole of the material is the same as the color of the region corresponding to the arranged mapping of a diagonal line of the mapping corresponding to the whole of the material.

8. The editing apparatus as set forth in claim 7, wherein the gradation added to the mapping has transparency.

9. The editing apparatus as set forth in claim 7, further comprising:
   operation means for operating the display control means,
   wherein the operation means selects a first display mode of which the gradation is added to the arranged mapping or a second display mode of which the gradation is not added to the arranged mapping corresponding to the operation of the operation means.

10. An editing apparatus that arranges mapping corresponding to the whole or a part of a material that has a time concept in time series on a screen and edits the mapping, comprising:
    a display section that displays information;
    a storage section that stores a material that has a time concept;
    a display control section that displays mapping corresponding to the whole or a part of a material that has a time concept on the display section,
    wherein gradation is set to mapping corresponding to the whole of the material and gradation that is set to a region corresponding to the arranged mapping of the gradation that has been set to the mapping corresponding to the while of the material to the arranged mapping; and
    an adding section that adds a part of a diagonal line to the region corresponding to the arranged mapping of a diagonal line of the mapping corresponding to the whole of the material to the arranged mapping;
    a setting section that sets color of the diagonal line for determining whether the region corresponds to the whole or which part of the material,
       wherein the color at the beginning of the gradation that has been set to the mapping corresponding to the whole of the material is the same as the color of the region corresponding to the arranged mapping of a diagonal line of the mapping corresponding to the whole of the material.

* * * * *